April 20, 1937.  K. E. BEMIS  2,078,190

DRINK MIXER

Original Filed Sept. 14, 1936

INVENTOR.
Kenneth E. Bemis
BY Philip A. Friedell
ATTORNEY.

Patented Apr. 20, 1937

2,078,190

UNITED STATES PATENT OFFICE 2,078,190

DRINK MIXER

Kenneth E. Bemis, Oakland, Calif.

Original application September 14, 1936, Serial No. 100,713. Divided and this application December 23, 1936, Serial No. 117,247

7 Claims. (Cl. 259—104)

This invention, a drink mixer, is designed for mixing malted milks and similar drinks made from frozen or partly frozen ingredients or mixtures, in such thorough and rapid manner as to substantially nullify melting of the mix during the agitating period actually required, causing a decided increase in volume with a minimum of melted ingredients in the finished drink.

This application is a division of my copending application, Serial No. 100,713, filed September 14, 1936, Patent No. 2,070,776, dated February 16, 1937, for a drink mixer, and is particularly directed to the container or insulating sleeve disclosed in that copending application.

The objects and advantages of the invention are as follows:

First; to provide a drink mixer with a sleeve for encompassing a container or mixing cup during agitation or whipping of a drink mixture, whereby the container is protected from extraneous heat and air currents and melting of the mix is reduced to a minimum.

Second; to provide a container or cup housing or sleeve which is rotatable with the container to permit reciprocal rotary motion of the container while it is completely inserted in the sleeve and protected about its entire peripheral surface.

Third; to provide a sleeve as outlined with an intermediate obstruction, which will function as a stop for the container only through manual urgence of the container for cooperation therewith, for clearing the spinner or agitator of any adhering mix.

Fourth; to provide a container housing or sleeve in which the upper portion entirely encompasses and encloses a container when raised to its uppermost position, and in which the lower portion of the sleeve frontally receives the container and forms a guide for the container while it is being raised into the upper portion of the sleeve.

Other objects and advantages of the invention will become apparent as the following description is read on the drawing forming a part of this specification, and in which similar reference characters are used to designate similar parts throughout the several views, of which;

Figure 1:
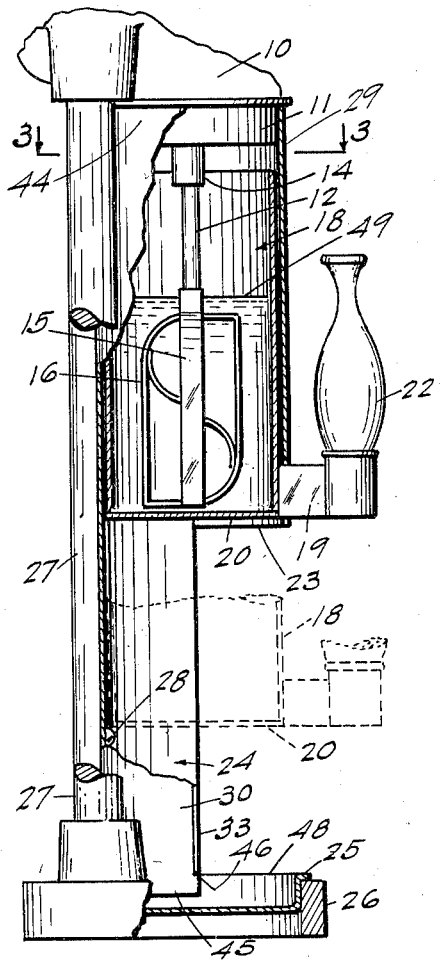
Fig. 1 is a side elevation of the invention, with a portion of the near side broken out to show the interior structure, and with the container or cup shown in its uppermost position and shown in section.
Figure 2:
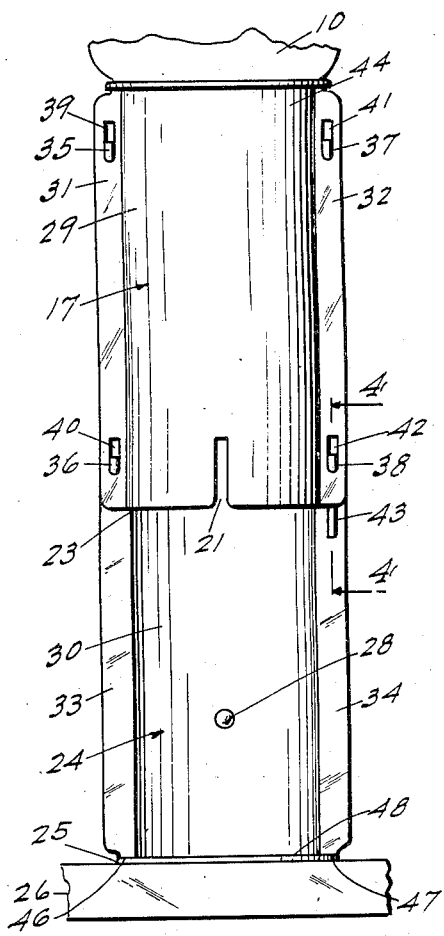
Fig. 2 is a front elevation of the invention with the container removed.

The invention is used in connection with any type of drink mixer having a head, motor, or motor saddle 10 for supporting the agitating or whipping means for mixing the drink.

A cylindrical pilot 11, or other sleeve locating means is formed at the lower end of the head, motor, or motor saddle, and the spinner or agitator shafts are eccentrically located in this pilot, these shafts being indicated as 12 and 13, rotatably mounted in the bearings 14, and each of these agitator shafts has an agitator or spinner mounted thereon. One of these shafts and agitators may be used, but where only one is provided, the container must be rotated through a greater angle during operation. The agitators are shown at 15—16.

The invention consists of a container housing or sleeve 17, which depends from the head or motor 10, and has an internal diameter great enough to slidably receive the container 18, and has a length sufficient for complete peripheral enclosure of the container therein by insertion from below.

This sleeve 17 coincidently forms an antisplash guard, a heat insulator for the container during mixing, and means permitting rotation of the container during mixing, at will.

Since it is impractical to locate the handle bracket 19 below the bottom 20 of the container 18, a slot 21 is formed in the lower end of the sleeve to receive this bracket, to permit complete insertion of the container or cup 18 within the sleeve.

This sleeve forms an insulator about the container during the mixing operation to protect the peripheral walls from extraneous heat, and thus minimizes melting of the mix.

A handle 22 is provided for manually raising the container into the sleeve and for manually retaining the container in its raised position, and also for manually rotatably reciprocating the container.

The sleeve 17 terminates at 23 and has a semicylindrical depending extension 24, which extends downwardly and has a bearing or support in a receptacle or sump 25 which is removably mounted in a base 26, and which extension functions as a guide for raising and lowering the container 18 into and out of the sleeve, and also functions as a drain to the sump for mix which may be splashed over the top of the container 18 during agitation.

Suitable supports 27 support the head 10 in vertically spaced relation to the base 26.

An obstruction 28 is located on the inside of the extension 24 to form a stop in conjunction with manual urgence of the container to cooperate therewith during lowering, to permit a brief operation of the agitators or spinners 15 and 16 above the level of the mix, for freeing the agitators of any adhering materials, the partly lowered position of the container being indicated by the dotted view, which is shown fragmentarily in Fig. 1.

This stop or obstruction 28 will not retain the container except through manual cooperation, it being necessary to urge the container toward the back wall of the extension, otherwise the container will slip past the stop and drop down onto the sump.

This sleeve is made removable for convenience in cleaning and is shown as consisting of two semi-cylindrical members 29 and 30, each of which has a flange formed along each side, as shown at 31, 32 on member 29, and 33, 34 on member 30.

Flanges 33 and 34 have depending fingers 35, 36, 37 and 38 formed to engage the front face of the flanges 31 and 32, and apertures 39, 40, 41 and 42 are formed in flanges 31 and 32 to frontally receive these engaging fingers 35 to 38, whereby the sleeve member 29 may be frontally applied, then slid upwardly until the spring latch 43 engages the bottom edge 23 of the front member, supporting the front member in its proper position, fingers 35 to 38 overlapping and securing the flanges together as shown.

As will be noted, the upper end 44 of the sleeve is rotatable on the pilot 11, and the lower end 45 of the extension 24 is rotatable in the receptacle or sump 25, the lower ends 46 and 47 of the flanges 33 and 34 riding on the rim 48 of the sump.

Figure 3:
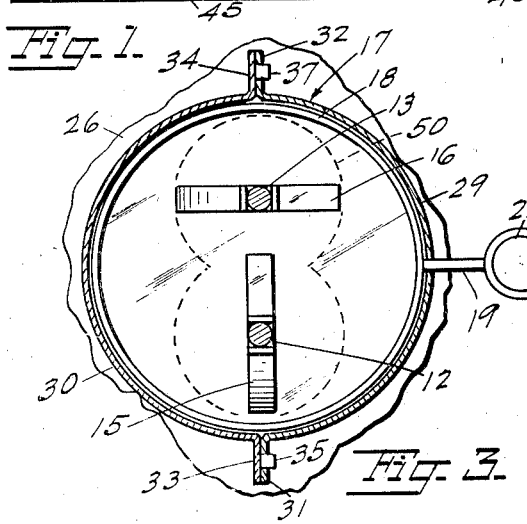
Fig. 3 is an enlarged section taken on line 3—3 of Fig. 1.
Figure 4:
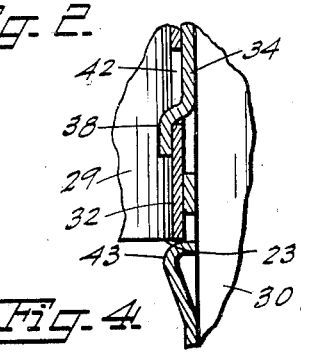
Fig. 4 is an enlarged section taken on line 4—4 of Fig. 2.

Irrespective of whether one or more agitators are used, for best results the agitator or agitators should be mounted eccentrically relative to the axis of the sleeve, so as to cooperate with, or closely to, the inner periphery of the container 18, as shown in Fig. 3.

Without rotating the container, the agitators would only operate to agitate the mixture 49 through a restricted volume or area, as indicated at 50; therefore, by manually rotatably reciprocating the container during agitation, the desired results are secured.

As the container is reciprocated through the medium of the handle 22, every portion of the sides up to a plane coincident with the top of the agitator, and the entire bottom surface of the container is acted upon by the agitator, and a thorough mix with a minimum of melting is completed in a minimum length of time, and freezing of any portion of the mix to the walls of the container is prevented.

As the container is lowered to the obstruction 28, as fragmentarily shown in dotted lines in Fig. 1, the agitator is located above the surface of the mix 49 and throws any adhering mix against the sides of the container, and any mix deposited on the walls of the sleeve will drain down to the sump 25.

The particular object of the slot 21 is not for the purpose of rotating the sleeve, but is for the purpose of permitting insertion of the container entirely within the sleeve while permitting the container to be rotated, and the same results would ensue in any construction or manner where the container was completely enclosed throughout its height and could still be rotated.

There is a specific purpose in not having any means other than manual for retaining the cup within the sleeve, and this purpose is to prevent over-agitation of the mix. The time required for complete agitation being thirty seconds or less, and over-agitation causing reduction in volume and melting, the operation should be under constant control of the operator.

It will be understood that variations in construction and arrangement of parts, which variations are consistent with the appended claims, may be resorted to, without detracting from the spirit or scope of the invention, or sacrificing any of the advantages thereof.

I claim:

1. In a drink mixer having a head and a base, a cup having a handle, a pilot on said head, a sump removably mounted in said base, a sleeve rotatable on said pilot and having an opening in the lower portion for frontal insertion of said cup, the upper portion of said sleeve slidably receiving said cup for complete peripheral enclosure to form insulating means therefore against extraneous heat during agitation of a mixture in said cup, said handle forming means for rotating said cup and sleeve coincidently and supporting said cup.

2. A structure as claimed in claim 1, and an obstruction located intermediate the height of said lower portion and cooperating with said cup upon lowering through manual urgence of the cup to cooperate therewith.

3. In a drink mixer having a head and a base, a cup, a handle having a bracket connected to the lower portion of said cup, a pilot on said head, a sump removably mounted in said base, and a sleeve consisting of an upper cylindrical portion having a height greater than the height of said cup and being rotatable on said pilot, and, a lower semi-cylindrical portion having a bearing in said sump and forming a guide for said cup during raising and lowering into and out of said upper portion and having a height greater than the height of said cup to permit frontal introduction thereof, and a slot formed in the lower end of the upper portion to receive said bracket to permit complete insertion of said cup into said upper portion.

4. A structure as claimed in claim 3, and an obstruction located intermediate the height of said lower portion for support of said cup in an intermediate position to permit clearing an agitator of adhering mix, said obstruction supporting said cup through manual urgence of the cup toward the obstruction.

5. In a drink mixer having a head and a base, a cup, a handle having a bracket connected to the lower portion of said cup, a pilot on said head, a sump removably mounted in said base, and a sleeve having its upper end rotatable on said pilot and its lower end rotatable in said sump and consisting of a front member and a rear member and detachable connecting means therefor, the upper end forming a cylindrical heat insulator for the cup and having a height fully receiving said cup, a slot formed in the lower end of said front member for receiving said bracket, the lower end of said front member being spaced from said base to frontally receive said cup.

6. A structure as claimed in claim 5, reception of said bracket in said slot forming cooperative means for coincidently rotating said cup and said sleeve through the medium of said handle, at will.

7. A structure as claimed in claim 5, said detachable connecting means comprising a flange formed along each side of each member, forwardly-projecting, depending fingers on the flanges of one member, apertures formed in the flanges of the other member to frontally receive said fingers, and a spring-urged latch on one flange of said one member cooperating with the lower end of, and supporting the other member when the other member is slid upwardly on the one member.

KENNETH E. BEMIS.